United States Patent [19]
Olafsson

[11] Patent Number: 6,163,570
[45] Date of Patent: Dec. 19, 2000

[54] METHODS AND APPARATUS FOR VERIFYING TRANSMIT POWER LEVELS IN A SIGNAL POINT LIMITED TRANSMISSION SYSTEM

[75] Inventor: Sverrir Olafsson, Reykjavik, Iceland

[73] Assignee: Conexant Systems, Inc., Newport Beach, Calif.

[21] Appl. No.: 09/075,719

[22] Filed: May 11, 1998

[51] Int. Cl.[7] .............................. H04L 27/18; H04L 5/16; H03D 1/24; H03C 5/00
[52] U.S. Cl. ......................... 375/223; 375/222; 375/320; 375/268
[58] Field of Search ................................... 375/223, 222, 375/268, 261, 302, 322, 298, 220, 225, 286; 379/97, 98, 96; 455/522, 69

[56] References Cited

U.S. PATENT DOCUMENTS

| | | | |
|---|---|---|---|
| 5,202,905 | 4/1993 | Sakamoto et al. | 375/377 |
| 5,265,151 | 11/1993 | Goldstein | 379/97 |
| 5,278,992 | 1/1994 | Su et al. | 455/69 |
| 5,396,519 | 3/1995 | Betts et al. | 375/296 |
| 5,493,586 | 2/1996 | Brownlie et al. | 375/265 |
| 5,598,435 | 1/1997 | Williams | 375/261 |

FOREIGN PATENT DOCUMENTS

| | | |
|---|---|---|
| WO 88/04498 | 6/1988 | WIPO. |
| WO 96/18261 | 6/1996 | WIPO. |

OTHER PUBLICATIONS

ITU–T "V.90", "Telecommunication Standardization Section of ITU" Sep. 1998. XP002107773.

*Primary Examiner*—Tesfaldet Bocure
*Assistant Examiner*—Khai Tran
*Attorney, Agent, or Firm*—Snell & Wilmer, LLP

[57] ABSTRACT

A pulse code modulation modem system utilizes the same total average transmit power formula for designing signal point constellations and for verifying that the transmit power of the signal point constellations are within a designated maximum power limit. The transmit power of the signal point constellations designed by the client modem is also calculated by the server modem to verify that the transmit power limit imposed upon the server modem is not exceeded. In addition, the modem system is capable of designating a transmit power limit associated with one or more training signal points or a training sequence for use during a training mode.

37 Claims, 4 Drawing Sheets

METHODS AND APPARATUS FOR VERIFYING TRANSMIT POWER LEVELS IN A SIGNAL POINT LIMITED TRANSMISSION SYSTEM

FIELD OF THE INVENTION

The present invention relates generally to the regulation of transmit power levels in a signal point limited data transmission system. In particular, the present invention relates to a data communication system that verifies whether the total average transmit power of a set of signal point constellations is within a designated transmit power limit.

BACKGROUND OF THE INVENTION 56 kbps modem systems are quickly becoming the preferred choice among consumers (for client-end modems) and internet service providers (for server-end modems). 56 kbps modem systems employ pulse code modulation (PCM) technology to facilitate higher downstream transmission data rates to an end user. For example, FIG. 1 depicts a conceptual diagram of a typical 56 kbps communication path using current PCM modem technology. A central site, such as an internet service provider (ISP) 100, is digitally connected to a telephone network 130 through a transmitter 110 and a receiver 120 resident at an ISP modem 105. The network 130 is connected to a local loop 150 through a central office line card 140. The line card typically has a PCM codec implemented therein. The local loop 150 is connected to the user's personal computer (PC) 170 at the user's site through the user's modem 160. As can be appreciated by those skilled in the art, the connection between the ISP modem transmitter 110 to the telephone network 130 is a digital connection that supports a typical data rate of about 64 kbps. Since the parameters of the telephone network 130 and line card 140 are dictated and set by the operating specifications of the network (and particularly the use of the $\mu$-law or A-law signal point constellations), the central site transmitter 110 is configured to transmit the digital data in a particular way to fully exploit its digital connection to the network.

Transmission power limitations for telecommunication systems (including modem systems) may be mandated by regulatory bodies such as the Federal Communications Commission (FCC). For example, current FCC regulations on modem transmissions over the public telephone network in the United States require that average power levels do not exceed −12 dBm0. Accordingly, the particular codewords associated with each transmission session, and the manner in which such codewords are transmitted, may be selected to ensure that a specific transmit power level is not exceeded. On the other hand, unnecessarily low power levels may cause a low system signal to noise ratio (SNR), which can result in an increased probability of errors and otherwise poor system performance.

In general, modem or other data communication systems that are not limited to the transmission of specific signal points may address the transmit power limitations in a relatively straightforward manner. For example, a modem system that is not limited to a particular set of transmit signal points may simply scale its output to comply with any regulatory restrictions. In contrast, in signal point limited systems (that may utilize signal point constellations designated by a receiver), no such scaling is possible and the constellation itself dictates the total average transmit power. Accordingly, the constellations designed by the receiver determine whether the transmitter complies with the transmit power regulations.

As mentioned above, regulatory bodies may place limits on the total average power utilized for a given data communication session. Because the transmit power limitations may vary from country to country, the digital modem in a 56 kbps system may initially provide the maximum transmit power limit to the analog modem such that the analog modem can design an appropriate signal point constellation set. Accordingly, after the appropriate signal point constellations are selected, the total average transmit power may be computed by the analog modem to ensure that the transmit power of the constellation set does not exceed the maximum transmit power limit. However, without an independent verification of the transmit power associated with the signal point constellations, the digital modem may utilize a signal point constellation set that, due to computational errors on the part of the analog modem, exceeds the maximum transmit power limit.

As mentioned above, conventional 56 kbps modem systems perform constellation design and power calculation at the analog modem (i.e., the client-end modem) after obtaining a maximum transmit power limit from the digital modem (i.e., the server-end modem). Unfortunately, the manner in which the analog and digital modems calculate the total average transmit power may vary from one device to the next. In other words, the same transmit power formula may not be rigidly followed by all modern devices. Consequently, the analog and digital modems may generate inconsistent transmit power calculations for the same signal point constellations.

Even if the analog and digital modems are in agreement with respect to the transmit power formula, practical operating limitations (such as processor bit resolution or the use of finite precision arithmetic) may introduce round off errors to the power verification procedure. Thus, like the above situation where two different transmit power formulas are employed, the analog and digital modems may obtain different transmit power results for the same signal point constellation set. The calculation of different results utilizing the same transmit power formula may adversely affect any verification routine later performed by the digital modem. For example, the digital modem may reject signal point constellations for exceeding the transmit power limit even though the analog modem designed the constellations to be within the transmit power limit and even though the analog modem may have already performed an initial verification.

Present 56 kbps modem systems may not consider transmission power levels during training procedures. For example, training sequences may be designated in advance without regard to any transmit power limitations imposed on the digital modem. Furthermore, present systems may not effectively select the training signal points in accordance with current operating conditions such as the presence of robbed bit signaling or digital pads. Such digital impairments may have a negative affect on the quality of the training procedure, especially if the training signal points are influenced by the digital impairments.

SUMMARY OF THE INVENTION

Accordingly, it is an advantage of the present invention that an improved data communication system for performing signal point limited transmissions is provided.

Another advantage of the present invention is that it provides a transmit power verification procedure that enables one modem device to verify the transmit power computation of another modem device.

Another advantage is that the total average transmit power of a signal point constellation set is calculated by both modem devices using the same power formula.

A further advantage of the present invention is that it provides a transmit power verification scheme that accurately verifies the transmit power of a signal point constellation set regardless of the computational resolution of the components used in the two modem devices.

Another advantage is that the data communication system is capable of designating a transmit power level for a signal point training sequence used during a training mode.

The above and other advantages may be carried out in one form by a data communication system for performing signal point limited transmissions. The data communication system includes a first device and a second device configured to communicate with one another over a communication channel, means for selecting a signal point constellation having a first computed transmit power less than or equal to a transmit power limit, and means for verifying that the first communication transmit power of the signal point constellation is less than or equal to the transmit power limit, where the first device includes the means for verifying. The first computed transmit power is calculated by the second device in accordance with a predetermined power calculation formula.

In accordance with another aspect of the present invention, the data communication system includes means for sending a transmit power limit from the first device to the second device, and means for selecting a training signal point amplitude having an average transmit power less than or equal to a transmit power limit, where the second device includes the means for selecting.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition those skilled in the art will appreciate that the present invention may be practiced in any number of data communication contexts and that the modem system described herein is merely one exemplary application for the invention. Further, it should be noted that the present invention may employ any number of conventional techniques for data transmission, control signaling, signal processing and conditioning, and the like. Such general techniques are known to those skilled in the art and will not be described in detail herein.

Figure 1:
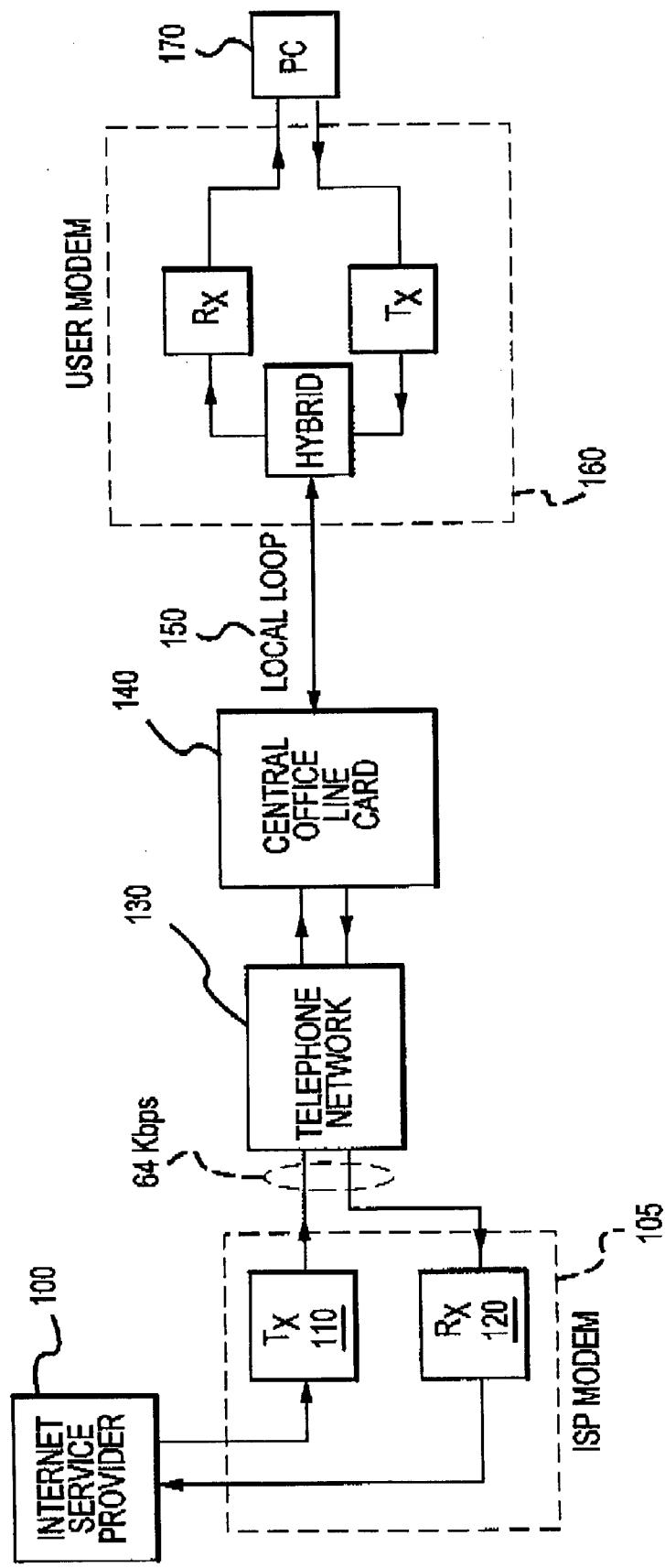
FIG. 1 is a block diagram of an exemplary pulse code modulation (PCM) modem system that may incorporate the present invention.
Figure 2:
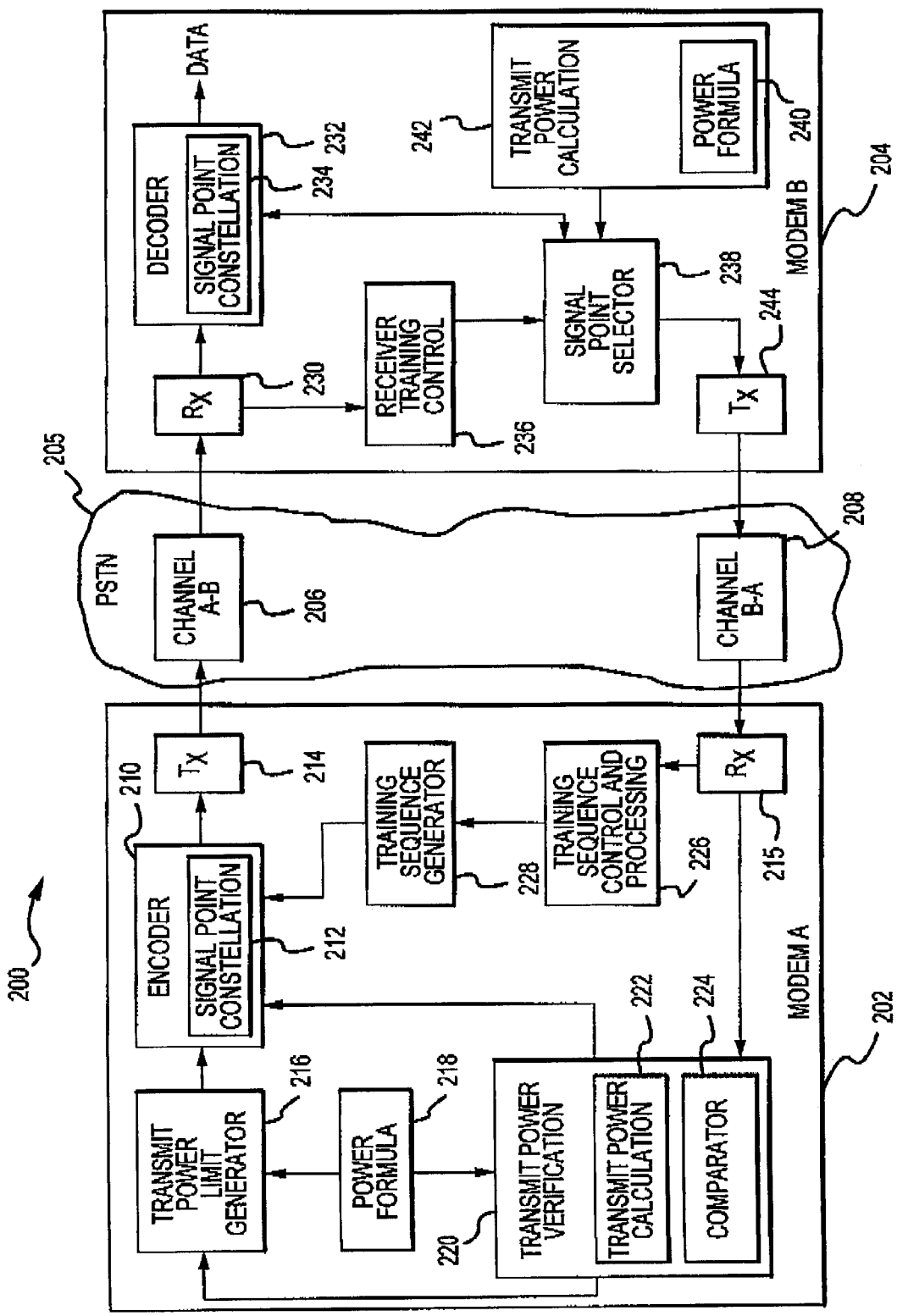
FIG. 2 is a block diagram of an exemplary PCM modem system configured to perform the transmit power verification procedures of the present invention.

An exemplary PCM modem system 100 that may incorporate the principles of the present invention is generally shown in FIG. 1, and FIG. 2 is a more detailed block diagram depiction of a PCM modem system 200 configured in accordance with the present invention. It should be appreciated that the particular implementation shown in FIG. 2 and described herein is merely exemplary and is not intended to limit the scope of the present invention in any way. Indeed, for the sake of brevity, conventional timing recovery, automatic gain control (AGC), synchronization, training, and other functional aspects of modem system 200 are not described in detail herein. Furthermore, the connecting lines shown in FIG. 2 are intended to represent exemplary functional relationships and/or physical couplings between the various elements. Those skilled in the art will recognize that many alternative or additional functional relationships or physical connections may be present in a practical modem system.

Modem system 200 is preferably configured as a signal point limited transmission system. In other words, modem system 200 may be limited to the transmission of specific, predetermined signal points contained in a signal point constellation. For example, the $\mu$-law and A-law signal point constellations are commonly used in the context of PCM modem systems. Indeed, according to current standard operating protocols all 56 kbps modem systems operate as signal point limited systems.

Generally, modem system 200 includes a first modem, e.g., modem 202, and a second modem, e.g., modem 204. Modems 202, 204 are generally configured in accordance with known principles to communicate over the public switched telephone network (PSTN) 205 via at least one communication channel, e.g., channels 206, 208. In the context of current 56 kbps modems, channel 206 may be considered to be a digital channel and channel 208 may be considered to be an analog or partially analog channel.

Although not shown in FIG. 2, each of modems 202, 204 may include a suitable processor configured to carry out various tasks associated with the operation of modem system 200. Indeed, modem system 200 may incorporate any number of processors or control elements as necessary to support its operation. Such processors or control elements may suitably interact with other functional components of modems 202, 204 to thereby access and manipulate data or monitor and regulate the operation of modem system 200.

First modem 202 preferably includes an encoder 210 configured to encode digital data in accordance with the particular encoding protocol employed by modem system 200. For example, multiple modulus conversion mapping and $\mu$-law or A-law signal point assignments may be used in conventional modem systems in accordance with various known and proprietary techniques. The output signal generated by encoder 210 may include information for transmission during a data mode, synchronization or training signals for transmission during an initialization mode, or control or other signaling data employed by modem system 200. A signal point constellation database 212 (containing the particular signal points utilized for the current communication session) may be associated with encoder 210, as depicted in FIG. 2. It should be appreciated that database 212 need not be an integral part of encoder 210 and that modem 202 may implement database 212 in a different manner than that shown.

Modem 202 includes a transmitter 214, which is configured to transmit encoded symbols in accordance with general PCM techniques. Such symbols may include data, training signals, synchronization signals, control signals, and the like. Modem 202 also includes a receiver 215, which is preferably configured in accordance with conventional modem technologies. Receiver 215 is configured to receive data from modem 204; such data may include encoded information bits, control signals, functional parameters or identifiers, and any other data employed by conventional modem systems. For example, and as described in more detail below, modem 204 may be configured to send information indicative of optimized signal point constellations to modem 202 for use during transmission of subsequent signal segments. Of course, modem 202 may employ any suitable alternative device or technique for receiving the optimized signal point constellations from modem 204. A decoder (not shown) resident at modem 202 may be used to decode any signals transmitted from modem 204 to modem 202, including the signal that conveys the signal point constellations.

In accordance with one aspect of the present invention, modem 202 is also configured to send modem 204, via transmitter 214, a transmit power limit that may govern one or more training signal points or one or more signal point constellations. As mentioned above, the transmit power limit may be associated with a regulatory limit imposed upon modem 202, e.g., the −12 dBm0 FCC limit. In addition, modem 202 may suitably generate the transmit power limit to compensate for a computational tolerance of modem 202 (and/or modem 204), operational characteristics of the communication channels, or the like, to ensure that the power verification techniques of the present invention are carried out in an effective and robust manner.

The transmit power limit may be calculated by a transmit power limit generator 216, which preferably uses a designated transmit power formula 218 known by both modems 202, 204. For example, the transmit power formula, or a suitable transmit power identifier, may be communicated between modems 202 and 204. The use of the designated power formula 218 may be desirable to ensure that modems 202, 204 perform compatible power calculations that can be compared in a meaningful manner. In accordance with an alternate embodiment of the present invention, modem 202 is suitably configured to select power formula 218 from a plurality of formulas. In this manner, modem system 200 is capable of selecting a power formula expression to contemplate the use of line coding, spectral shaping, or other current operating characteristics or functional features of the telephone network or modem system 200. In this alternate embodiment, modem 202 may suitably communicate the selected transmit power formula to modem 204 during an initialization or startup procedure. It should be appreciated that the power formula selection may instead be carried out by modem 204.

The transmit power limit may be utilized by modem system 200 as a design parameter during the selection and verification of signal point constellations and/or training signal points having particular amplitudes. Consequently, the transmit power formula 218 may also be utilized by a transmit power verification element 220. Transmit power verification element 220 is configured to verify that the total average transmit power of the signal point constellations designed by modem 204 is less than or equal to the relevant transmit power limit. This verification feature enables modem 202 to verify the transmit power associated with the constellations rather than merely assuming that the constellations are within the transmit power limit. Furthermore, because both modems 202, 204 utilize the same formula for calculating the transmit power, the likelihood of an erroneous verification is reduced. It should be noted that, depending upon the specific application, system tolerances, or the like, transmit power verification element 220 may be configured to accept or reject signal point constellations on the basis of any suitable threshold or comparison relative to the transmit power limit, and that the conditions for verification described herein are merely exemplary.

Transmit power verification element 220 may include or be operatively associated with a transmit power calculation element 222 and a comparator element 224. Power calculation element 222 is preferably configured to calculate, in accordance with the predetermined power calculation formula 218, a computed transmit power of the signal point constellations designed by modem 204. As mentioned above, transmit power considerations can play an important role during adaptive signal point constellation design and various optimization techniques. Accordingly, modem systems must be designed to operate in a robust and reliable manner while maintaining the total average transmit power within the given limit. For this reason, if the transmit power of a constellation exceeds the power limit, then the modem system 200 may redesign the constellation such that its total average power is within an acceptable range.

Although the present invention can be used in the context of any transmit power formulation, the preferred 56 kbps modem embodiment employs a power formula 218 that contemplates the unequal probability of occurrences associated with the signal points within the signal point constellations. Generally, the power calculation initially determines the probability of transmission of each individual signal point within a particular constellation. Then, the probabilities of occurrence are used to generate the average total power for each constellation (current 56 kbps modem systems use six signal point constellations associated with different data frame segments). Finally, the power for all of the constellations is determined and averaged to produce the total average power for the given data communication session. An exemplary exact power calculation scheme suitable for use with modem system 200 is described in detail in U.S. patent application Ser. No. 09/013,671, filed Jan. 26, 1998; the entire content of this patent application is incorporated herein by reference.

Comparator element 224 is suitably configured to determine whether the total average transmit power calculated by power calculation element 222 is less than or equal to the transmit power limit. Accordingly, transmit power verification element 220 may receive the transmit power limit from, or otherwise operate in conjunction with, transmit power limit generator 216.

Power verification element 220 is preferably configured to accept or reject the signal point constellations provided by modem 204 in response to the determination made by comparator 224 (described in more detail below).

As described above, the transmit power limit may be utilized by modem system 200 to guide the selection of training signal point magnitudes by modem 204. Accordingly, modem 202 may include a control and processing element 226 associated with the generation of training sequences that contain the training point amplitudes selected by modem 204. Control and processing element 226 is preferably configured to control the operation of a training sequence generator 228. In the preferred embodiment, one training signal point amplitude is utilized in a training sequence, and training sequence generator 228 may format the training sequence such that it includes a plurality of signal points corresponding to positive and negative values of the particular training point amplitude. Thus, training sequence generator may include a suitable polarity assigner (not shown) that assigns a positive or a negative polarity to the transmitted training symbols.

With continued reference to FIG. 2, signals transmitted to modem 204 over channel 206 are received by a receiver 230. It should be noted that receiver 230 may include any number of additional components (that may be known in the art) for decoding, equalization, conditioning, or other processing of the received signal. Modem 204 processes received data signals to obtain the original digital data encoded by modem 202; modem 204 includes a decoder 232 to suitably decode the received symbols in accordance with the same encoding scheme employed by encoder 210. As with encoder 210, decoder 232 may have a signal point constellation database 234 associated therewith. Database 234 is preferably utilized to store the same signal point constellations that are stored at and utilized by modem 202 for the current communication session.

Modem 204 may include a receiver training control block 236 that initiates and regulates training or resynchronization processes within modem 204. As shown in FIG. 2, receiver training control block 236 may be associated with receiver 230 to enable the adaptive equalization of receiver 230 in response to the training sequence sent by modem 202. As described above, prior to the training procedure, modem 204 may receive a predetermined transmit power limit from modem 202. Modem 204 may then access a signal point selector 238 to determine which training signal point amplitude would be suitable for the given power limit.

For complex training sequences that include more than one signal point, modem 204 may utilize a transmit power calculation element 242 (that uses a designated transmit power formula 240) to suitably calculate the transmit power associated with the training signal points or the proposed training sequence itself.

Signal point selector 238 is also configured to select at least one signal point constellation (and preferably a set of constellations) such that the signal point constellation set has a computed transmit power less than or equal to the transmit power limit identified by modem 202. Power calculation element 242 computes the total average transmit power of the signal point constellations in accordance with the designated power formula 240 and in a similar manner as transmit power calculation element 222 (resident at modem 202). In practice, modem 204 is the first device to compute the total average transmit power of the signal point constellation. Modem 202 subsequently verifies that the computed transmit power is indeed within the specified transmit power limit. If the calculation performed by modem 202 determines that a constellation set designed by modem 204 exceeds the transmit power limit, then that constellation set is either discarded or modified by signal point selector 238 until an acceptable constellation set is obtained.

A transmitter 244 is preferably utilized to send information indicative of the designated training signal point amplitude or amplitudes to modem 202. In the preferred embodiment, the information transmitted by transmitter 244 is encoded prior to transmission over PSTN 205. Upon receipt of this information, modem 202 performs decoding and processing to obtain the training point amplitudes for subsequent use by training sequence generator 228. Then, during a training mode, a suitable training sequence is sent from modem 202 to modem 204. Thereafter, the signal point constellations (within the designated transmit power limit) designed by modem 204 are transmitted, via transmitter 244, to modem 202. Modem 202 suitably extracts the signal point constellations for the transmit power verification procedure. If modem 202 verifies that the transmit power associated with the signal point constellations is within the designated transmit power limit, then a data communication session can be initiated.

Figure 3:
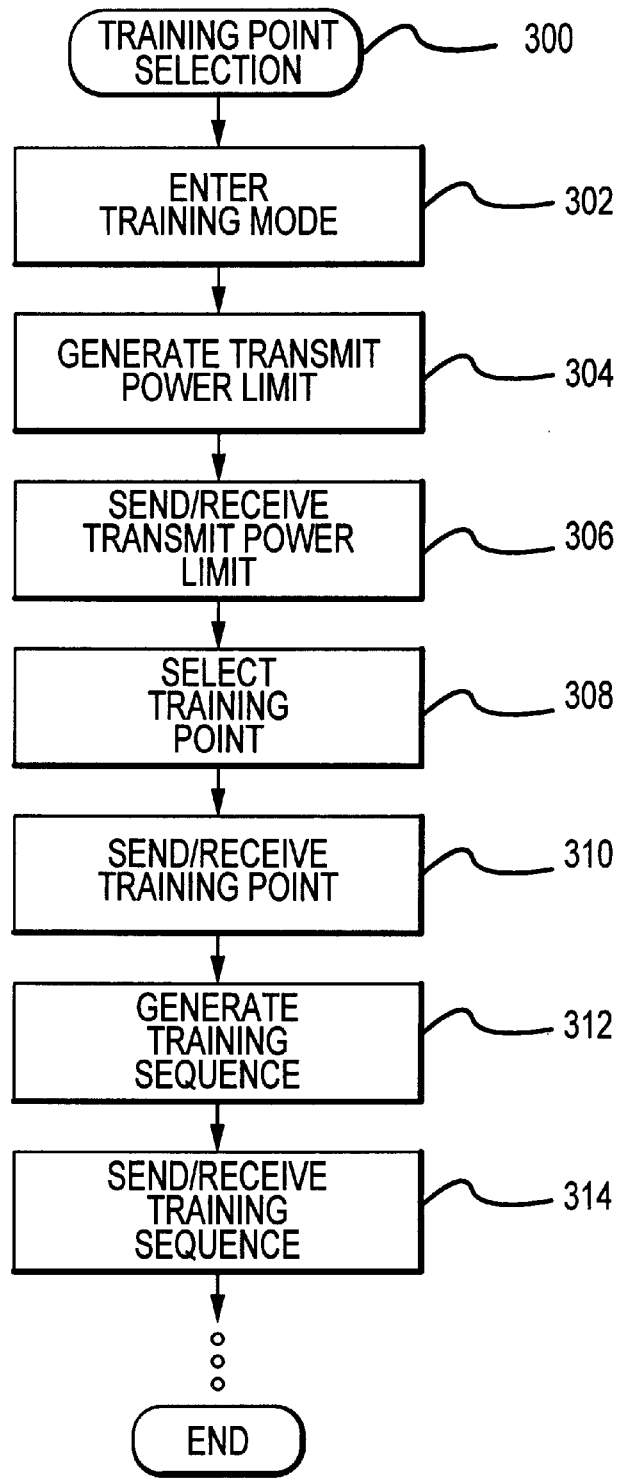
FIG. 3 is t flow diagram of an exemplary training point selection process that may be performed by the modem system shown in FIG. 2.

Referring now to FIG. 3, an exemplary training point selection process 300 is illustrated as a flow diagram. Although not depicted as such, specific portions of process 300 may be performed by modem 202 or modem 204. Process 300 is preferably performed by modems 202, 204 during an initialization or startup procedure after communication channels 206, 208 have been established. Process 300 may begin with a task 302, during which modems 202, 204 enter a training mode. Task 302 may be prompted by a certain control signal sequence transmitted by modem 202. Alternatively, task 302 may follow a predetermined sequence of initialization or startup routines, where such sequencing is synchronized at both modems 202, 204.

After a training mode is established between modems 202, 204, a task 304 may be performed to cause modem 202 to generate a transmit power limit for application during the selection of one or more training signal points. As described above in connection with FIG. 2, the transmit power limit may be suitably generated in response to a computational tolerance of modem 202 (and/or modem 204), a regulatory limit imposed upon transmissions by modem 202, or operational characteristics of communication channels 206 or 208. Regulatory limits that rarely change, such as the −12 dBm0 FCC power limit described above, may be stored in a suitable memory element for access by transmit power limit generator 216. Alternatively, modem 202 may generate new transmit power limits for each communication session to compensate for other functional parameters. For example, modem 202 may generate a lower transmit power limit to compensate for the nonlinearity of network codecs present in channels 206, 208. In addition, modem 202 may lower the transmit power limit to ensure that its computational precision does not cause an erroneous acceptance or rejection of training points or a signal point constellation set designed by modem 204.

Following task 304, a task 306 is preferably performed to cause modem 202 to send the current transmit power limit to modem 204. In addition, modem 204 receives the current transmit power limit during task 306. Modem 204 uses the received transmit power limit to select at least one suitable training signal point (task 308). As described above in connection with FIG. 2, signal point selector 238 is preferably configured to perform task 308. In the preferred embodiment one training point amplitude is selected during task 308, i.e., the resultant training signal is a sequence of positive and negative symbols containing the specified signal point amplitude.

Modem 204 selects a training signal point having an average transmit power less than or equal to the transmit power limit. In addition, modem 204 may consider any number of factors during the selection of the training signal point. Such flexibility may be desirable to enable modem system 200 to contemplate practical limitations associated with the current communication session. For example, the selection of the training signal amplitude may be biased toward those signal points having relatively higher average transmit powers. The use of higher power signal points is desirable to increase the signal to noise ratio associated with the subsequent transmission of the training sequence. This additional consideration may also be associated with the design of the signal point constellations used during the data mode.

The selection of the training point may also be responsive to the presence of a digital impairment, e.g., robbed bit signaling (RBS), within communication channel 206. In this context, the training point may be selected to either reduce the effect of RBS within the received training sequence or to increase the detection of RBS within the received training sequence. Those skilled in the art will appreciate that, because digital impairments such as RBS may affect a specific frame segment or a particular bit within a transmitted codeword, any number of processing techniques may be employed to address the presence of RBS. For example, the training signal point amplitude (or a corresponding codeword) may be represented by a number of digital bits, and signal point selector 238 may be suitably configured to select the training signal point amplitude in accordance with a predetermined bit assignment for at least one of the digital bits that represent the signal point amplitude. For example, because RBS typically replaces the least significant bit of a codeword with a "1", task 308 may be designed to select a training signal point amplitude that is represented by a codeword having a "1" as its least significant bit (such a selection would reduce the effect of RBS in the training sequence). On the other hand, if the objective is to easily detect the presence of RBS in the training sequence, then task 308 may instead select a training signal point amplitude that is represented by a codeword having a "0" as its least significant bit.

After the selection of the training point by modem 204, a task 310 is performed. During task 310, the specific training signal point amplitude (or data indicative thereof) is sent from modem 204 to modem 202 in an appropriate manner. In addition, modem 202 suitably receives the training signal point amplitude during task 310. As described above, training sequence control and processing element 226 (see FIG. 2) may receive the training signal point amplitude and thereafter control the operation of training sequence generator 228. Accordingly, a task 312 is preferably performed to generate a training sequence that includes a plurality of signal points corresponding to the specified amplitude. As described above, task 312 may suitably assign positive and negative polarities to the plurality of signal points to form the training sequence. The particular polarity assignment may vary for different applications or to accomplish different training objectives.

A task 314 causes modem 202 to transmit the training sequence over channel 206. Modem 204 suitably receives the training sequence during task 314 and thereafter trains receiver 230 (and any other applicable components) in response to the training sequence. Following task 314, training point selection process ends. In due course, modem system 200 may enter an adaptive constellation design mode followed by a data transmission mode.

Figure 4:
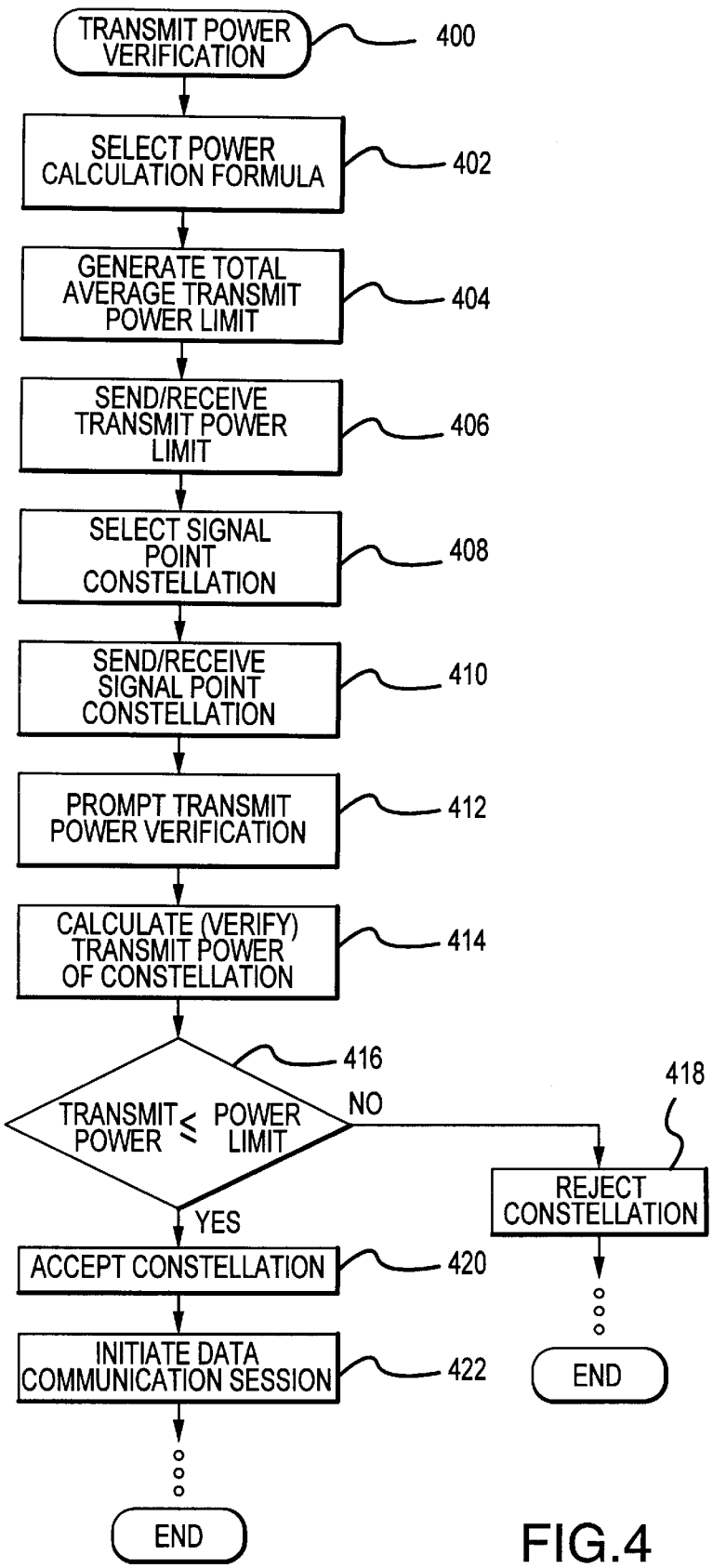
FIG. 4 is a flow diagram of an exemplary transmit power verification process that may be performed by the modem system shown in FIG. 2.

The adaptive constellation design mode may be performed in conjunction with a transmit power verification process 400, which is illustrated as a flow diagram in FIG. 4. Portions of process 400 may be performed by modem 202 while other portions of process 400 may be performed by modem 204. Process 400 may begin with a task 402, which causes modem system 200 to select a transmit power calculation formula from a plurality of formulas. Task 402 may not be necessary in systems that utilize only one predetermined power calculation formula. In other systems, task 402 may be desirable to enable the selection of a transmit power formula that is particularly suitable for communication channels 206, 208 or for the current operating characteristics of modem system 200. If necessary, task 402 may be performed at either of modems 202, 204, and the selected power formula may be communicated between modems 202, 204 via a suitably transmitted control sequence.

Next, a task 404 may be performed to generate, in accordance with the selected power calculation formula, a transmit power limit. As described above, task 404 is preferably performed by modem 202 and, in particular, transmit power limit generator 216 (see FIG. 2). In the preferred embodiment, task 404 generates a limit for the total average transmit power for use by modem 204 during the adaptive design of a set of signal point constellations. As described above in connection with training point selection process 300 (see FIG. 3), the total average transmit power limit may be suitably generated in response to a computational tolerance of modem 202 (and/or modem 204), a regulatory limit imposed upon transmissions by modem 202, or operational characteristics of communication channels 206 or 208.

A task 406 causes modem 202 to send the transmit power limit (generated during task 404) to modem 204; modem 204 receives the transmit power limit during task 406. After modem 204 receives the transmit power limit, a task 408 is preferably performed to select a signal point constellation (or a set of constellations) such that the constellation set has a first computed transmit power less than or equal to the transmit power limit (as described above, the constellation set may be alternatively designed to satisfy any condition relative to the power limit). The first computed transmit power is calculated in accordance with the designated power calculation formula. Thus, both modems 202, 204 utilize a consistent power formula during their respective calculations.

In accordance with the preferred embodiment, the first computed transmit power is associated with an upper bound calculation with respect to the predetermined power calculation formula. In other words, the finite arithmetic precision of modem 204 is taken into consideration such that the first computed transmit power will not be less than a computed value using infinite precision arithmetic. It should be appreciated that modem 204 need not always employ an upper bound calculation. For example, if suitable approximation power formulas are used that are known to provide a result within a certain error margin, then that error margin can be added to the result of the power calculation before it is compared to the transmit power limit.

In a practical modem system, the selection of the specific constellation signal points may be governed by a number of criteria other than transmit power, e.g., network and channel characteristics. Consequently, any number of conventional techniques may be employed during task 408; a detailed explanation of such techniques, including adaptive constellation design, is beyond the scope of this description.

Following task 408, modem 204 has preferably designed a set of signal point constellations that, according to the calculations performed by modem 204, have a first computed total average transmit power less than or equal to the transmit power limit. Next, a task 410 causes modem 204 to transmit the constellations (or data indicative of the constellations) to modem 202, which suitably receives the constellations. A task 412 may be performed to prompt modem 202 to verify that the total average transmit power of the constellations is less than or equal to the designated transmit power limit. Modem system 200 may utilize conventional control or signaling techniques to perform task 412.

During a task 414, modem 202 verifies the first computed total transmit power by calculating, in accordance with the predetermined power calculation formula, a second computed transmit power of the signal point constellations. In the preferred embodiment, the second computed transmit power is associated with a lower bound calculation with respect to the predetermined power formula. In other words, the finite arithmetic precision of modem 202 is taken into consideration such that the first computed transmit power will not be greater than a computed value using infinite precision arithmetic. The lower bound calculation is preferably utilized to ensure that modem 202 does not reject constellations that were correctly designed by modem 204. It should be appreciated that modem 202 need not always employ a lower bound calculation. For example, if suitable approximation power formulas are used that are known to provide a result within a certain error margin, then the transmit power limit can be selected at an appropriately lower level to include the certain error margin.

Following task 414, a query task 416 may be performed by comparator 224 (see FIG. 2) to test whether the second computed transmit power is less than or equal to the designated total transmit power limit. As mentioned previously, the specific condition analyzed during query task 416 may vary according to the particular system. If query task 416 determines that the second calculated transmit power exceeds the predetermined power limit, then a task 418 is preferably performed to reject the current set of signal point constellations. Following task 418, transmit power verification process 400 ends. Task 418 may prompt modem 204 to perform a redesign of the constellations to lower the transmit power, i.e., process 400 may be reentered at task 408 following task 418.

If query task 416 determines that the second computed transmit power does not exceed the designated total power limit, then a task 420 is performed to accept the set of constellations designed by modem 204. Acceptance or verification of the signal point constellations may cause the constellations to be suitably stored at, e.g., constellation database 212 for subsequent use during the data mode. Following task 420, a task 422 may prompt modem system 200 to initiate a data communication session utilizing the current (and verified) signal point constellations. Process 400 ends after task 422. Thus, process 400 ensures that modems 202, 204 both utilize the same transmit power formula during their respective calculations, while providing a transmit power verification procedure for modem system 200.

In summary, the present invention provides an improved data communication system for performing signal point limited transmissions. A modem system in accordance with the present invention performs a transmit power verification procedure that enables one modem device to verify the transmit power computation of another modem device. The transmit power verification scheme accurately verifies the transmit power of a signal point constellation set regardless of the computational resolution of the components used in the two modem devices. The total average transmit power of a signal point constellation set is calculated by both modem devices using the same power formula. In addition, the modem system is capable of designating a transmit power level for a signal point training sequence used during a training mode.

The present invention has been described above with reference to a preferred embodiment. However, those skilled in the art will recognize that changes and modifications may be made to the preferred embodiment without departing from the scope of the present invention. For example, some aspects of the present invention may not be limited to any particular hardware implementation. In addition, the various processing tasks may be equivalently performed in a different order than that shown and described herein. These and other changes or modifications are intended to be included within the scope of the present invention as expressed in the following claims.

What is claimed is:

1. A method for verifying transmit power levels in a signal point limited transmission system, wherein said system having:
   a first device configured to communicate with a second device over a communication channel;
   said method comprising the steps of:
   receiving at said first device, a plurality of signal points from said second device, said plurality of signal points having a first computed transmit power, as determined by said second device, less than or equal to a transmit power limit, said first computed transmit power being calculated in accordance with a transmit power calculation formula;
   calculating, at said first device, in accordance with said transmit power calculation formula, a second computed transmit power of said plurality of signal points; and
   comparing, at said first device, said second computed transmit power with said transmit power limit, to determine whether said second computed transmit power is less than or equal to said transmit power limit.

2. A method according to claim 1, wherein said first computed transmit power is less than said transmit power limit.

3. A method according to claim 1, wherein said second computed transmit power is less than said transmit power limit.

4. A method according to claim 1, further comprising the steps of:
   generating said transmit power limit using said transmit power formula; and
   sending said transmit power limit between said first and second devices.

5. A method according to claim 4, wherein said generating step generates a total average transmit power limit.

6. A method according to claim 1, further comprising the steps of:
   accepting said plurality of signal points when said comparing step determines that said second computed transmit power is less than or equal to said transmit power limit; and
   rejecting said plurality of signal points when said comparing step determines that said second computed transmit power is greater than said transmit power limit.

7. A method according to claim 1, wherein said first computed transmit power is associated with an upper bound calculation with respect to said transmit power calculation formula.

8. A method according to claim 1, wherein said calculating step calculates said second computed transmit power in accordance with a lower bound calculation with respect to said transmit power calculation formula.

9. A method according to claim 1 further comprising the step of selecting said transmit power calculation formula from a plurality of formulas.

10. A method according to claim 9 wherein said selecting step is responsive to current operating characteristics of said transmission system.

11. A method according to claim 1, further comprising the step of generating said transmit power limit in accordance with said transmit power calculation formula and in response to at least one of:
- a computational tolerance of said first device;
- a regulatory limit imposed upon said first device; and
- operational characteristics of said communication channel.

12. A method for verifying transmit power levels in a signal point limited transmission system having a first device configured to communicate with a second device over a communication channel, said method comprising the steps of:
- receiving, at said second device, a transmit power limit calculated in accordance with a predetermined power calculation formula;
- selecting at least one signal point constellation such that said at least one signal point constellation has a first computed transmit power less than or equal to said transmit power limit, said first computed transmit power being calculated in accordance with said predetermined power calculation formula;
- transmitting said at least one signal point constellation from said second device to said first device; and
- prompting said first device to verity that the transmit power of said at least one signal point constellation is less than or equal to said transmit power limit.

13. A method according to claim 12, further comprising the steps of:
- calculating, in accordance with said predetermined power calculation formula, a second computed transmit power of said at least one signal point constellation; and
- determining whether said second computed transmit power is less than or equal to said transmit power limit, said determining step being performed by said first device.

14. A method according to claim 13, further comprising the step of initiating a data communication session utilizing said at least one signal point constellation.

15. A method according to claim 14, wherein said initiating step is performed when said determining step determines that said second computed transmit power is less than or equal to said transmit power limit.

16. A method according to claim 12, wherein said first computed transmit power is associated with an upper bound calculation with respect to said predetermined power calculation formula.

17. A method according to claim 12, further comprising the step of selecting said predetermined power calculation formula from a plurality of formulas.

18. A method according to claim 17, wherein said selecting step is responsive to current operating characteristics of said transmission system.

19. A data communication system for performing signal point limited transmissions, said system comprising:
- a first device and a second device configured to communicate with one another over a communication channel;
- means for selecting at least one signal point constellation such that said at least one signal point constellation has a first computed transmit power less than or equal to a transmit power limit, said first computed transmit power being calculated by said second device in accordance with a predetermined power calculation formula; and
- means for verifying that said transmit power of said at least one signal point constellation is less than or equal to said transmit power limit, said first device comprising said means for verifying.

20. A data communication system according to claim 19, wherein said means for selecting is configured to select said at least one signal point constellation such that said first computed transmit power is less than said transmit power limit.

21. A data communication system according to claim 19, wherein said first computed transmit power is associated with an upper bound calculation with respect to said predetermined power calculation formula.

22. A data communication system according to claim 19, wherein said first device further comprises means for calculating said transmit power limit in accordance with said predetermined power calculation formula.

23. A data communication system according to claim 22, wherein said means for calculating is configured to calculate a total average transmit power limit.

24. A data communication system according to claim 19, wherein said first device further comprises a first transmitter configured to send said transmit power limit to said second device.

25. A data communication system according to claim 19, wherein said second device further comprises a second transmitter configured to send said at least one signal point constellation to said first device.

26. A data communication system according to claim 19, wherein said means for verifying comprises:
- means for calculating, in accordance with said predetermined power calculation formula, a second computed transmit power of said at least one signal point constellation; and
- means for determining whether said second computed transmit power is less than or equal to said transmit power limit.

27. A data communication system according to claim 26, wherein said means for calculating calculates said second computed transmit power in accordance with a lower bound calculation with respect to said predetermined power calculation formula.

28. A data communication system according to claim 19, further comprising means for selecting said predetermined power calculation formula from a plurality of formulas.

29. A data communication system according to claim 28, wherein said means for selecting is configured to select said predetermined power calculation formula in accordance with current operating characteristics of said transmission system.

30. A data communication system according to claim 19, wherein said first device further comprises means for generating said transmit power limit in accordance with said predetermined power calculation formula and in response to at least one of:
- a computational tolerance of said first device;
- a regulatory limit imposed upon said first device; and
- operational characteristics of said communication channel.

31. A data communication system for performing signal point limited transmissions, said system comprising
- a first device and a second device configured to communicate with one another over a communication channel;
- means for sending a transmit power limit from said first device to said second device; and
- means for selecting at least one training signal point amplitude having a total average transmit power less than or equal to said transmit power limit, said second device comprising said means for selecting.

32. A data communication system according to claim 31, wherein said first device further comprises means for generating a training sequence comprising a plurality of signal points corresponding to said at least one training signal point amplitude.

33. A data communication system according to claim 32, wherein said means for generating assigns positive and negative polarities to said plurality of signal points.

34. A data communication system according to claim 31, wherein:

a training signal point amplitude is represented by a number of digital bits; and said means for selecting is configured to select said at least one training signal point amplitude in accordance with a predetermined bit assignment for at least one of said number of digital bits.

35. A data communication system according to claim 31, wherein said means for selecting is configured to select said at least one training signal point amplitude in response to the presence of a digital impairment within said communication channel.

36. A data communication system according to claim 31, wherein said means for selecting is configured to favor the selection of training signal point amplitudes having relatively higher average transmit powers.

37. A data communication system according to claim 31, wherein said means for selecting selects said at least one training signal point amplitude such that said at least one training signal point amplitude has a total average transmit power less than said transmit power limit.

* * * * *